United States Patent Office 3,808,229
Patented Apr. 30, 1974

3,808,229
6-OXO-TETRAHYDROINDOLE DERIVATIVES
Mitsutaka Kawazu, Urawa, Tamio Morikawa, Tokyo, Eiji Kaneko, Saitama, Tamotsu Danno, Moriguchi, and Kiyokazu Shimomura, Takatsuki, Japan, assignors to Tanabe Seiyaku Co., Ltd., Osaka, Japan
No Drawing. Filed Jan. 19, 1972, Ser. No. 219,134
Claims priority, application Japan, May 12, 1970, 45/40,254
Int. Cl. C07d 27/38
U.S. Cl. 260—326.11                                         3 Claims

ABSTRACT OF THE DISCLOSURE

A noradrenaline derivative of the formula:

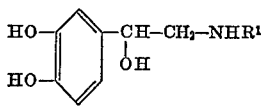

wherein $R^1$ is an alkyl radical of three to four carbon atoms, is oxidated by conventional manner, and the resultant 1 - substituted - 3 - hydroxy - 5,6 - dioxo-2,3,5,6-tetrahydroindole is condensed with a semicarbazide compound of the formula:

$$R^2\text{---}NH\text{---}CO\text{---}NHNH_2$$

wherein $R^2$ is hydrogen atom or a carboxy-benzyl radical. A 6-oxo-tetrahydroindole derivative of the formula:

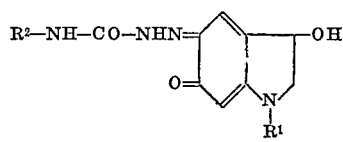

wherein $R^1$ and $R^2$ have the same meaning as defined above, is produced. The compound or a pharmaceutically acceptable salt thereof exhibits a hemostatic action, and a preventive action on vascular permeability of pigment.

---

This invention relates to novel 6-oxo-tetrahydroindole derivatives and a process for preparing same. More particularly, it relates to the derivatives of the formula:

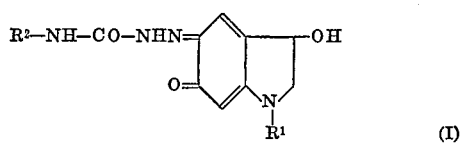

wherein $R^1$ is an alkyl radical of three to four carbon atoms, $R^2$ is hydrogen atom or a carboxy-benzyl radical, and pharmaceutically acceptable salts thereof.

It has been found that the 6-oxo-tetrahydroindole Compound I and their salts are useful as a hemostatic. That is compounds of the Formula I exhibit a potent hemostatic action and a strong preventive action on vascular permeability of pigment. For instance, when examined by orally administering said compound to male mice at a dose of 30 mg./kg., the Compound I showed a decrease of 20-30% in bleeding time as compared with the control group after one hour of administration. Moreover, the preventive effect of compounds of the formula against vascular permeability of pigment were 2-3 times stronger than that of carbazochrome sodium sulfate (chemical name: sodium 1-methyl-5-semicarbazono-6-oxo-2,3,5,6-tetrahydroindole-3-sulfonate). These facts are shown in the following experiments.

The acute toxicity of the compounds of the Formula I of the present invention are considerably low. When administered orally to male mice, the $LD_{50}$ of 1-n-butyl-3-hydroxy - 5 - semicarbazono - 6 - oxo - 2,3,5,6 - tetrahydroindole and 1 - isopropyl - 3 - hydroxy - 5-[4-(p-carboxy - benzyl) - semicarbazono] - 6 - oxo - 2,3,5,6-tetrahydroindole are respectively more than 3000 mg./kg.

According to the present invention, compound of the Formula I can be prepared by oxidating a noradrenaline derivative of the formula:

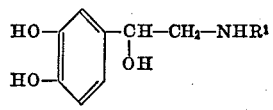

wherein $R^1$ has the same meaning as defined above, and condensing the resultant 1-substituted-3-hydroxy-5,6-dioxo - 2,3,5,6 - tetrahydroindole (III) with a semicarbazide compound of the formula;

$$R^2\text{---}NH\text{---}CO\text{---}NHNH_2 \qquad (IV)$$

wherein $R^2$ has the same meaning as defined above.

The oxidation reaction of the invention can be accomplished in conventional manner. For instance, Compound III is prepared by mixing Compound II with an oxidating agent in an inert solvent. Suitable examples of the oxidating agent include potassium ferricyanide, silver dioxide, tetrachloro-p-benzoquinone and the like. Water, methanol, acetic acid, dimethylformamide and tetrahydrofuran are suitable as a reaction solvent. It is preferred to carry out the reaction at $-15°$ to $35°$ C.

The condensation reaction of Compound III with the semicarbazide Compound IV can be carried out in the presence of a basic agent. Alkali metal carbonate, alkali metal hydroxide and alkali metal acetate are useful as the basic agent. The same solvent employed in the oxidation reaction are also suitable as the reaction solvent. It is preferred to carry out the reaction at 0° to 35° C.

After the reaction is completed, the Compound I may be readily recovered in a purified state. For instance, the precipitated crystals in the reaction solution are collected by filtration, and then the crystals are recrystallized from a solvent (e.g., methanol) to give the Compound I as pure crystals of reddish orange color.

The Compound I, in which $R^2$ is a carboxy-benzyl radical, can be used for pharmaceutical use either as the free acid or a metal salt thereof. These compounds are readily convertible from one to the other by conventional means. Pharmaceutically acceptable metal salts are, for example, sodium salt, potassium salt, calcium salt, etc.

The 6-oxo-tetrahydroindole Compound I of the present invention may be incorporated within a pharmaceutical preparation in conjunction with or admixed with a pharmaceutical excipient that is suitable for enteral or parenteral administration. Excipients which do not react with the Compound I should be selected. Gelatin, lactose, glucose, sodium chloride, starch, magnesium stearate, talcum, vegetable oil, benzyl alcohol and gums are suitable. Other known medicinal excipients may be employed. The pharmaceutical preparation may be, for instance, a solid dosage form such as a tablet, a coated tablet, a pill or a capsule; or a liquid disage form such as, for example, a solution, a suspension or an emulsion.

The pharmaceutical preparation may be sterilized and/ or contain auxiliaries, such as preserving, stabilizing, wetting or emulsifying agents. The pharmaceutical preparation may further contain other therapeutically valuable substances.

Practical and presently-preferred embodiments of the present invention are illustratively shown in the following examples.

EXPERIMENT (Hemostatic activity)

A test compound (see table) was administered orally to male mice weighing 15–20 g. at a dose of 30 mg./kg.

After an hour, the tail was cut with a knife at its diameter of 2 mm. Then, the blood was absorbed with a filter paper every 5 seconds and the time required until stoppage of bleeding was observed. The results are shown in the following table.

(Preventive effect against the vascular permeability-accelerating action of bradykinin)

A test compound (see table) was administered intramuscularly to rabbits weighing 2–3 kg. at a dose of 20 mg./kg. After an hour, 6 μg. of bradykinin were administered intracutaneously in the abdominal region of the rabbits. Then, 50 mg./kg. of Evans-blue were administered intravenously to the rabbits. After 30 minutes, the rabbits were killed and the amount of the pigment permeated through blood vessels was measured in accordance with the modified Harada's method [Allergy (Japan), vol. 15, pages 1–7, 1966]. The results are shown in the following table.

TABLE

| Compound | Bleeding time (second) | Amount of pigment permeated through blood vessels (μg.) |
| --- | --- | --- |
| 1-n-butyl-3-hydroxy-5-semicarbazono-6-oxo-2,3,5,6-tetrahydroindole | 76.8 | 20 |
| 1-isopropyl-3-hydroxy-5-[4-(p-carboxy-benzyl)-semicarbazono]-6-oxo-2,3,5,6-tetrahydroindole | 64.2 | 28 |
| Carbazochrome sodium sulfate | 91.2 | 34 |
| Control | 91.9 | 40 |

EXAMPLE 1

1.2 g. of N-n-butyl-noradrenaline are dissolved in a mixture of 1 ml. of acetic acid and 9 ml. of water. A solution of 6.6 g. of potassium ferricyanide and 1.9 g. of sodium bicarbonate in 20 ml. of water is added dropwise to the mixture at 5–7° C. The mixture is allowed to stand for 20 minutes. Then, a solution of 0.5 g. of semicarbazide hydrochloride and 0.38 g. of anhydrous sodium acetate in 5 ml. of water is added to the mixture. After allowing to stand the mixture for an hour at room temperature, the crystals precipitated are collected by filtration. The crystals thus obtained are recrystallized from methanol. 0.58 g. of 1-n-butyl-3-hydroxy-5-semicarbazono-6-oxo-2,3,5,6-tetrahydroindole is obtained as reddish orange crystals. M.P. 202–203° C. (decomp.).

EXAMPLE 2

1.19 g. of N-isopropyl-noradrenaline hydrochloride are dissolved in a mixture of 1 ml. of acetic acid and 9 ml. of water. A solution of 5.3 g. of potassium ferricyanide and 1.5 g. of sodium bicarbonate in 20 ml. of water is added dropwise to the mixture at 5–7° C. The mixture is allowed to stand for 20 minutes. Then, a solution of 1.01 g. of 4-(p-carboxy-benzyl) - semicarbazide hydrochloride and 0.5 g. of anhydrous sodium acetate in 10 ml. of water is added to the mixture. After allowing to stand the mixture for an hour at room temperature, the crystals precipitated are collected by filtration. The crystals thus obtained are recrystallized from methanol. 0.98 g. of 1-isopropyl-3-hydroxy - 5 - [4-(p-carboxy-benzyl)-semicarbazono]-6-oxo-2,3,5,6-tetrahydroindole is obtained as reddish orange crystals. M.P. 200–202° C. (decomp.).

What we claim is:

1. A compound of the formula:

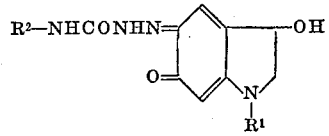

wherein $R^1$ is isopropyl or butyl, and $R^2$ is p-carboxybenzyl when $R^1$ is isopropyl, or $R^2$ is hydrogen when $R^1$ is butyl; or a pharmaceutically acceptable salt thereof.

2. 1-n-butyl - 3 - hydroxy - 5 - semicarbazono-6-oxo-2,3,5,6-tetrahydroindole.

3. 1 - isopropyl-3-hydroxy - 5 - [4-(p-carboxy-benzyl)-semicarbazono] - 6 - oxo - 2,3,5,6 - tetrahydroindole or a pharmaceutically acceptable metal salt thereof.

References Cited

Weigershausen et al., Chem. Abs., vol. 67, 52529g (1967).
Bullock et al., Chem. Abs., vol. 45, 9034–35 (1951).
Heacock et al., Chem. Abs., vol. 54, 18467–68 (1960).

JOSEPH H. NARCAVAGE, Primary Examiner

U.S. Cl. X.R.

424—274